United States Patent [19]
Conti

[11] Patent Number: 5,102,253
[45] Date of Patent: Apr. 7, 1992

[54] SNAP-FIT DEVICE FOR JOINING TWO PARTS TOGETHER

[75] Inventor: Jerome Pugliesi-Conti, 40 rue Royale, 92210 Saint-Cloud; Christian Girardiere, 25 bis rue Franklin, 75116 Paris, both of France

[73] Assignee: Christian Girardiere, Paris, France

[21] Appl. No.: 581,259

[22] Filed: Aug. 13, 1990

Related U.S. Application Data

[63] Continuation of Ser. No. 327,549, Mar. 23, 1989, abandoned.

[30] Foreign Application Priority Data

Mar. 25, 1988 [FR] France .................... 88 03933
Dec. 8, 1988 [FR] France .................... 88 16133

[51] Int. Cl.⁵ .................................... F16L 17/00
[52] U.S. Cl. .................................... 403/5; 403/31; 52/580
[58] Field of Search ........... 403/5, 31; 52/580, 581, 52/588, 127.4

[56] References Cited

U.S. PATENT DOCUMENTS

| | | | |
|---|---|---|---|
| 1,684,980 | 9/1928 | Ward et al. | |
| 2,930,637 | 3/1960 | Heller | 403/5 |
| 2,992,479 | 7/1961 | Musser et al. | 403/31 X |
| 3,462,180 | 8/1969 | Bunyan | 403/31 X |
| 3,638,973 | 2/1972 | Poletti | 403/31 X |
| 3,698,750 | 10/1972 | Eastcott et al. | 403/31 X |
| 3,971,580 | 7/1976 | Tantlinger et al. | |
| 3,979,164 | 12/1976 | Kuchnir | 403/31 X |
| 4,188,142 | 2/1980 | Olsson | 403/31 |
| 4,264,229 | 4/1981 | Falk et al. | 403/31 X |
| 4,303,150 | 12/1981 | Olsson | 403/31 X |
| 4,428,737 | 1/1984 | Schwenzfeier et al. | 403/5 X |
| 4,833,760 | 5/1989 | Sundström | 403/31 X |

FOREIGN PATENT DOCUMENTS 0161958 4/1984 European Pat. Off. .
0152277 2/1985 European Pat. Off. .

Primary Examiner—Andrew V. Kundrat
Attorney, Agent, or Firm—Lowe, Price, LeBlanc & Becker

[57] ABSTRACT

A snap-fit device is provided for joining two parts of any shape together by fitting, perpendicularly to their junction surfaces, at least one element projecting from the junction surface of one of the parts, after slight deformation thereof, into a recess in the junction surface of the other part, and engagement of the projection element, by resilient return thereof, on a surface portion of the recess. Inside the device, a separation actuator is operable for separating the engagement projection from the portion on which it is engaged, against the resilient return force of the projection. The separation means is externally activated by a hydraulic or pneumatic pressure or a vacuum source.

26 Claims, 4 Drawing Sheets

SNAP-FIT DEVICE FOR JOINING TWO PARTS TOGETHER

This application is a continuation application of application Ser. No. 07/327,549, filed Mar. 23, 1989 now abandoned.

BACKGROUND OF THE INVENTION

The present invention relates to snap-fit devices for joining two parts of any shape together by fitting, perpendicularly to their junction surfaces, at least one element projecting from the junction surface of one of the parts, after slight deformation thereof, into a recess in the junction surface of the other part, and engagement of said projection element, by resilient return thereof, on a surface portion of said recess.

The parts to be joined together by this snap-fit device may be of very varied kinds, e.g. wall elements, shaped bars, planks, roofs, racks, and any type of partitions.

This type of junction provides good locking but does not permit unlocking, so ready dismantling of the parts difficult and/or may require destruction or disassembly of the joined elements.

SUMMARY OF THE INVENTION

The purpose of the invention is to provide a snap-fit device which can easily be uncoupled to permit disassembly. For this, the invention provides internal means actuable for separating a male engagement projection from a female cavity portion in which it is engaged, against a resilient return force of the projection. The invention further includes means for externally actuating the separation means to permit uncoupling of the projection from the female portion.

In one embodiment the separation means is an inflatable joint mounted between projecting element and the female portion and connected to a pressure source. In another embodiment, separation is caused by retraction of the joint under a vacuum.

In still another embodiment, the separation means is formed by an air-tight chamber, of which a part of the projecting element forms a wall portion and is disposed so that a difference between the pressure in this chamber and the external pressure causes separation of said projection from the portion on which is it engaged. A duct is provided passing through one of the parts to be joined together. One end of the duct is located outside the device and with an opposite end formed in the chamber and permitting connection thereof to a pneumatic machine, namely a pressure or vacuum source.

When the chamber is to be connected to a vacuum source, the chamber may be formed either by intimate tight contact, material on material, of the projecting element of one part against a wall of the other part. Alternatively, the chamber can be formed by the projections of one of the parts and of the resilient joints at the ends of said projections or by the projection of one of the parts and a resilient membrane connecting their ends together or else by the projections of one of the parts and a wall connecting their ends together and integrally formed therewith. In one of the latter two embodiments, for example, the device of the invention readily provides snap-fitting of large sized parts, particularly by connecting the chamber to the vacuum source, thus causing the engagement projections to draw together.

When the chamber is connected to a pressurized fluid source, it may for example be formed between at least one projection of one of said parts and the wall of the other part on which the projection is engaged. As can be seen, the arrangement of the invention provides great simplicity of construction and use, since it comprises no active material element mounted on the parts to be joined together and since it may be fitted to the snap-fitting systems of parts having varied shapes.

When the area of the junction surfaces of the parts is small, for example in the case of joining together two panels disposed perpendicularly to each other, the projecting engagement elements and the sealed chamber may form part of a separate element housed in a cavity of one of the parts. In order to facilitate snap-fitting of the parts together, this separate element may be slidably mounted in said cavity and returned to a seated position by a spring.

BRIEF DESCRIPTION OF THE DRAWINGS

By way of non limitative example, different embodiments of junction devices in accordance with the invention have been shown in the drawings in which.

DESCRIPTION OF THE PREFERRED EMBODIMENTS

Figure 1:
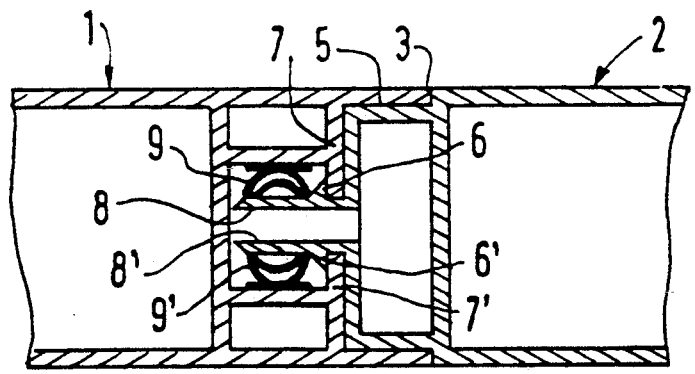
FIGS. 1, 2 and 3 are horizontal sectional views perpendicular to the junction plane of two panels snap-fitted together with unlocking by an inflatable joint.

In example shown in FIG. 1, the two panels are formed by shaped sections 1 and 2 with parallel walls between which is housed a material such as a cellular plastic material or wood. Each panel 2 has, on one of its end faces 3 intended to come into contact with an end face 4 of the adjacent panel 1. Elements 5, 5' project with respect to the joining plane and symmetrical with respect to the median plane of the panel. Elements 5, 5' have, in the vicinity of their ends 8, 8', spurs 6, 6' extending away from the median plane of the panels.

Each panel 1 has on opposing end surfaces 4 inner partitions 7, 7' symmetrical formed with respect to the median plane of the panel. The respective shape and arrangement of partitions 7, 7' and of elements 5, 5' are such that, when panel 2 is moved by translation towards panel 1, elements 5, 5' are engaged by ends 8, 8' in the space between partitions 7, 7'. Spurs 6, 6' then abut against these partitions and elements 5, 5' can only penetrate further through a slight resilient deformation of ends 8, 8' which draws them closer together. When spurs 6, 6' have passed by the partitions 7, 7' these ends 8, 8' are returned resiliently to their initial positions and spurs 6, 6' are engaged against partitions 7, 7'. The end faces 3, 4 are then in contact with each other. The junction of panels 1 and 2 is locked not only in the longitudinal fitting direction but also in the transverse direction. But, in this position, ends 8, 8' of elements 5, 5' are themselves in contact with the flexible wall of inflatable tubes 9, 9' fixed to the shaped section 1.

With tubes 9, 9', it can be seen that inflation thereof by any appropriate means and source external to the wall causes ends 8, 8' to draw closer together and so release spurs 6, 6' from partitions 7, 7' and unlocks the system joining the panels together. The panels may then be separated from each other by moving them apart in directions reverse to the assembly direction.

Figure 2:
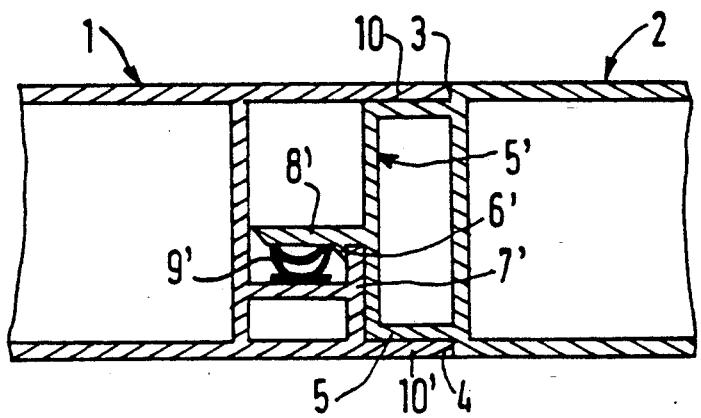

In the example shown in FIG. 2, only a pair of engagement projections are provided, namely arm 8' and its spur 6' on shaped section 2 and partition 7' on shaped section 1. Locking in the transverse direction with respect to the fitting direction is provided by the end walls 5, 5' of shaped section 6 coming into abutment against the end walls 10, 10' of shaped section 1.

Figure 3:
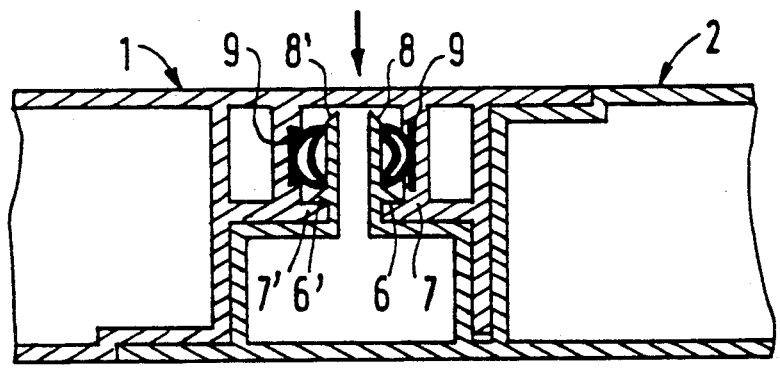

The example of FIG. 3 shows the joining of two shaped sections 1, 2 by the same snap-fit system as that shown in FIG. 1, but in which the engagement projections 8, 8' of shaped section 2 are fitted into shaped section 1 in a transverse direction, i.e. perpendicular to the longitudinal median plane of the sections. Spurs 6, 6' come into engagement against partitions 7, 7'. Inflatable joints 9, 9' force projections 8 and 8' together permitting separation of the panels in the direction opposite the fitting direction.

Figure 4:
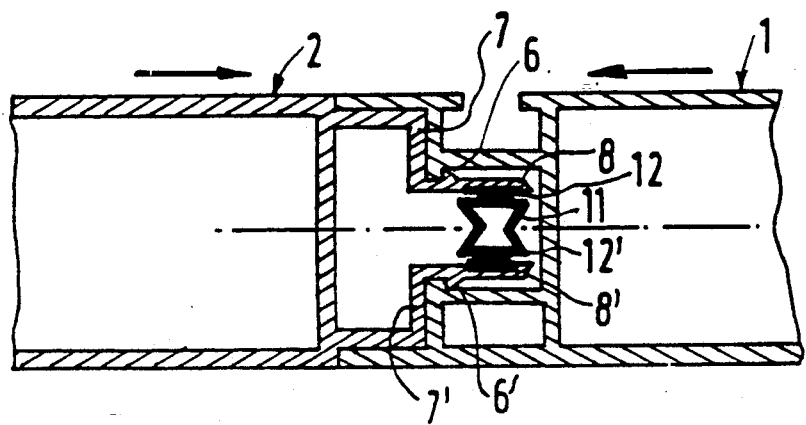
FIG. 4 is a view similar to that of FIGS. 1 to 3, but unlocking is provided by a retractable joint.

The example of FIG. 4 shows a junction of the same type as that of FIG. 1 but in which unlocking is caused by retraction under the effect of the vacuum of a joint 11 whose opposite faces 12, 12' are fixed to arms 8, 8'. The means for unlocking by an inflatable or retractable joint has the advantage that this joint also plays the role of seal, but other equivalents could be substituted for this means, namely any means causing the separation of one of the panels from abutment with the other panel. Thus, for example, a pneumatic or hydraulic actuator or a means using magnetic field properties, for example an electromagnet, could be used.

Figure 5:
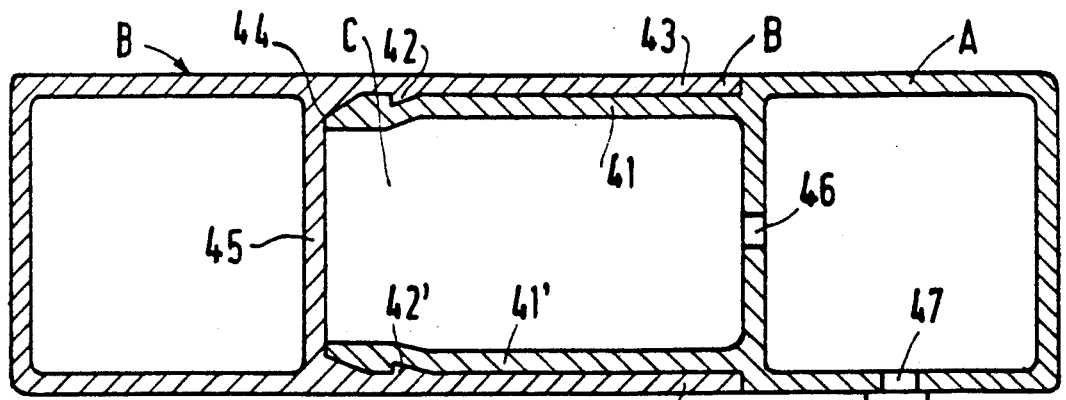
FIGS. 5 to 10 are sectional views of walls, or profiles, in a joined position.

In the example of FIG. 5, panels A and B are fitted together and locked by engagement of the two parts 41, 41' of panel A on the projections 42, 42' of parts 43, 43' of panel B. A sealed chamber C is formed by close contact, material on material, of walls 41-43 and 41', 43' and of the engagement ends 44, 44' against the wall 45 of panel B. Duct 46 opens into chamber C and through connection 47 it may be connected to a vacuum pump. The creation of a depression in chamber C causes walls 41 and 43 and walls 41', 43' to move away from each other which causes disengagement of walls 41, 41' from projections 42, 42', i.e. separation and disengagement of panels A and B.

Figure 6:
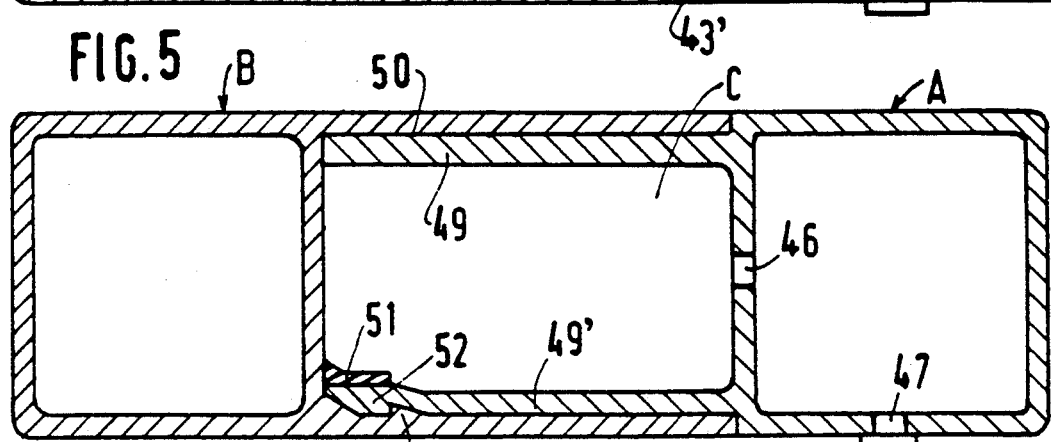

In the example shown in FIG. 6, a snap-fitting includes a single projection 48. Chamber C is sealed by direct contact of the smooth portion 49 of panel A on the smooth portion 50 of panel B and by a resilient joint 51 at the end of the engagement projection 52, portion 49 having a greater rigidity than portion 49'.

Figure 7:
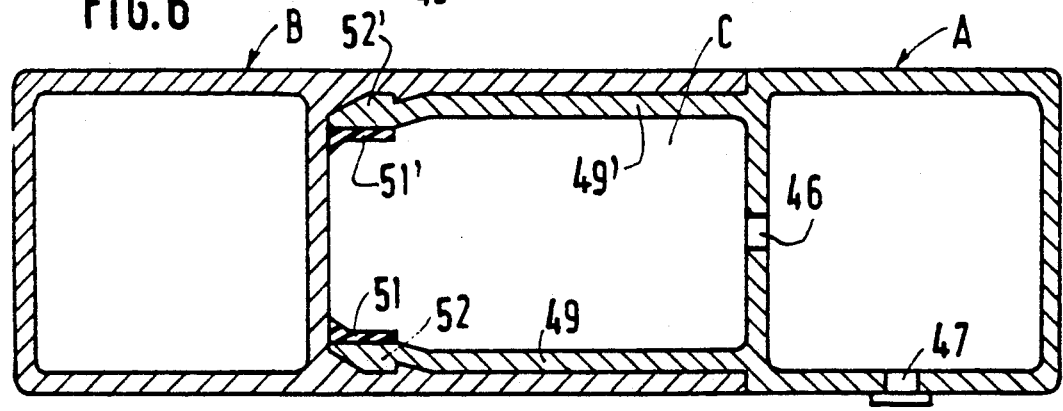

The arrangement shown in FIG. 7 is similar to that of FIG. 2 but comprises two engagement projections and two resilient seals or resilient terminations of projections 52, 52' integrally formed therewith.

Figure 8:
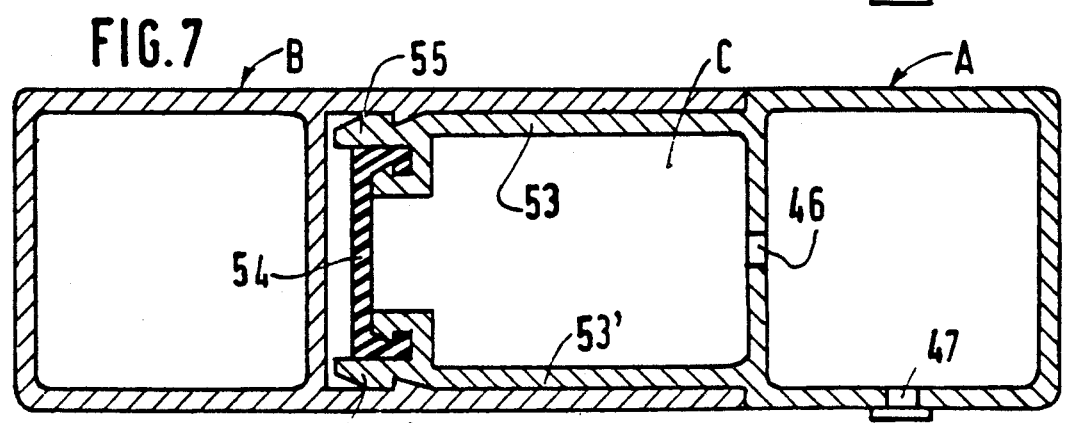

In the example shown in FIG. 8, the sealed chamber C is defined by projections 53, 53' of panel A and a resilient member 54 joining together the engagement ends 55, 55' of projections 53, 53'.

Figure 9:
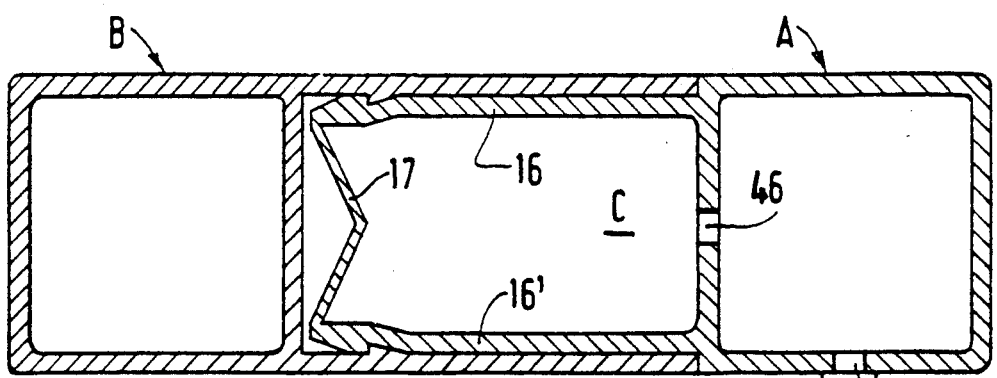
Figure 13:
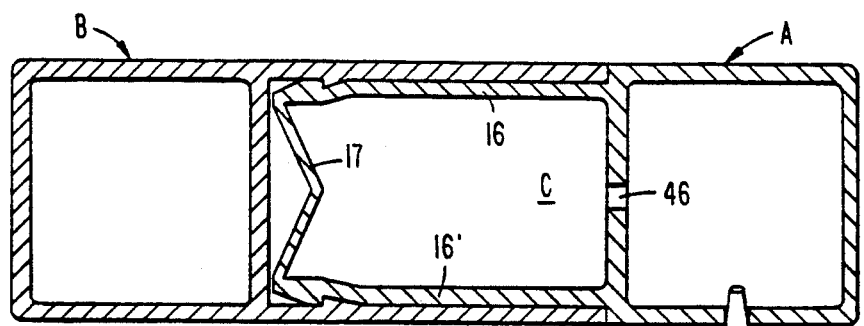
FIG. 13 is a sectional view of the embodiment of FIG. 9 connected to a vacuum source.

In the example of FIG. 9, the sealed chamber C is defined by projections 16, 16' of shaped section A and a wall 17 joining together the ends of projections 16, 16' and formed integrally therewith. The vacuum created inside chamber C causes deformation of wall 17 and disengagement of projections 16, 16'. In can be seen in the above described embodiments that it is easy to snap-fit parts A and B together without effort by creating a vacuum in chamber C before fitting part A into part B, so as to causes projections 16, 16' to draw closer together. FIG. 13 shows the device connected to a vacuum source prior to establishment of a decreased pressure in chamber C.

Figure 10:
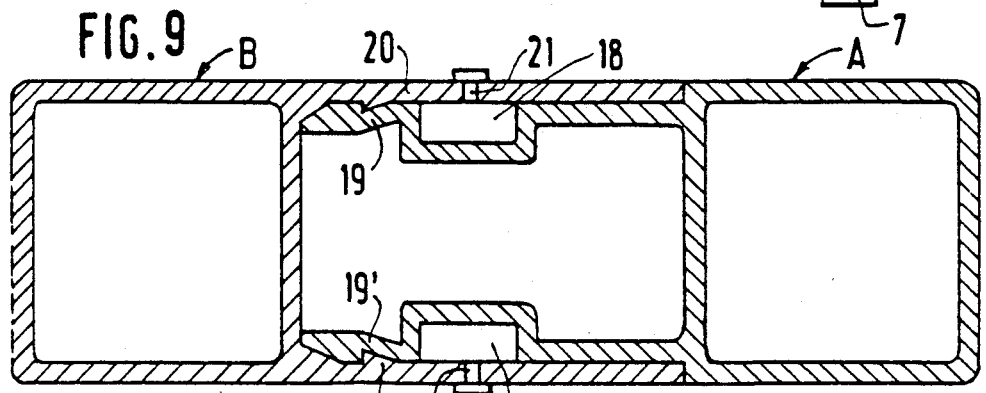
Figure 14:
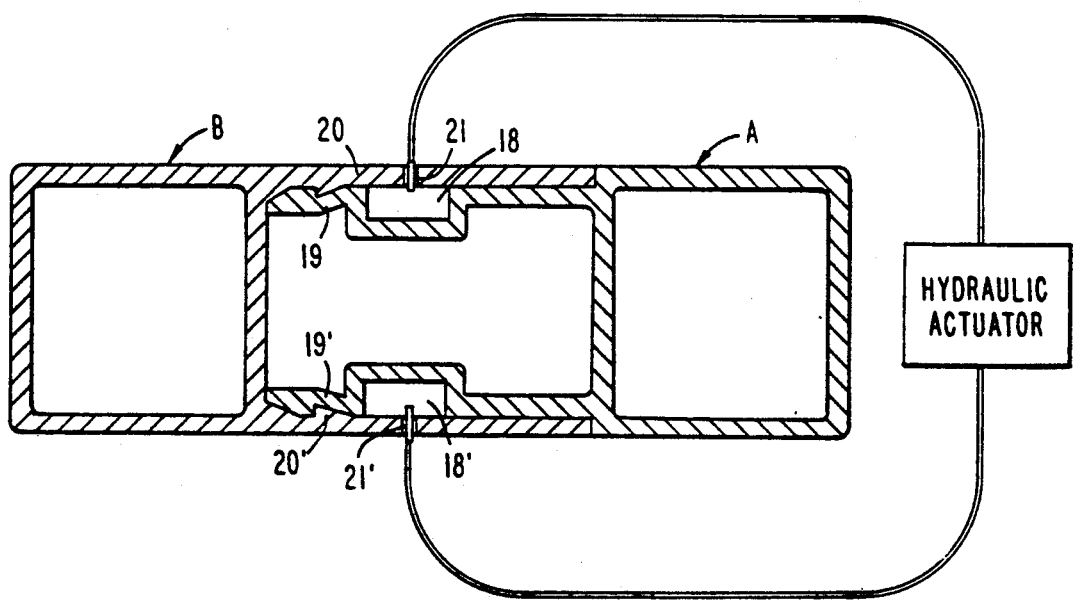
FIG. 14 is a sectional view of the embodiment of FIG. 10 connected to a hydraulic actuator.

In the example of FIG. 10, two sealed chambers 18, 18' are formed between the engagement projections 19, 19' of panel A and walls 20, 20' of panel B. The introduction of compressed air or another gas through duct 21, 21' into chambers 18, 18' moves the projections away and disengages them for unlocking the junction. FIG. 14 shows a hydraulic actuator connected to chambers 18 and 18' prior to establishing an increased pressure therein.

Figure 11:
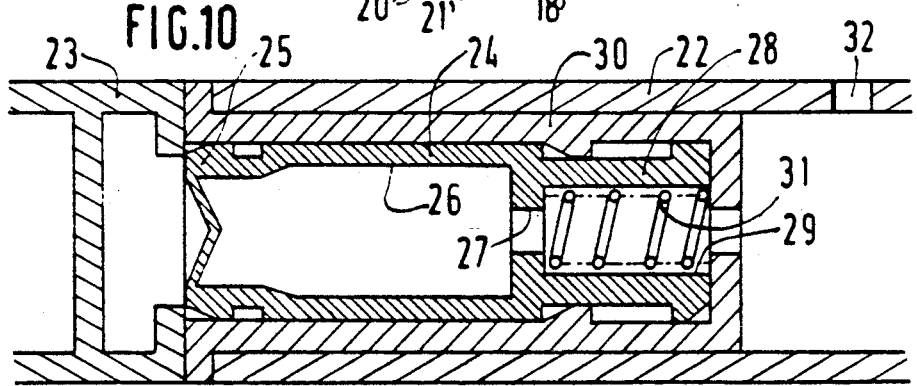
FIGS. 11 to 12 are sectional views of a mechanism for assembling together two profiles or panels disposed perpendicularly to each other.
Figure 12:
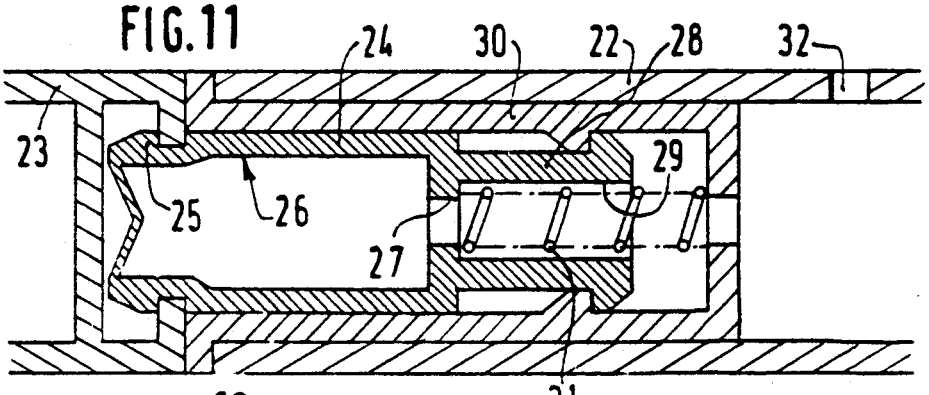

FIGS. 11 and 12 illustrate the use of a junction device of the invention for assembling together two panels 22, 23 disposed perpendicularly to each other.

Vertical panel 22 has associated therewith a part 24 with snap-fit projections 25, 25' and a chamber 26 communicating with the outside through a small orifice 27. Part 24 is extended by a cylindrical end piece 28 having a bore 29 and in which orifice 27 emerges. Part 24 is mounted for sliding in a sleeve 30 fast with panel 22 between a first position in which it is completely inside the sleeve and a second position in which projections 25, 25' are outside the sleeve, a spring 31 returning part 24 to its second position.

FIG. 12 shows the situation in which the two panels 22 and 23 are joined together and locked by snap-fitting. By connecting orifice 32 to a vacuum source, the vacuum acts in chamber 26 and causes projections 25, 25' to draw together and so unlocking. Spring 31 is thereby compressed bringing the snap-fitting element 24 into the position shown in FIG. 11. By cutting off the effect of the vacuum, spring 31 causes part 24 to slide in sleeve 30 and snap-fitting thereof by resilient deformation of projections 25, 25' on panel 23. In a variant, spring 31 is omitted and its action is replaced by that of compressed air, or another fluid.

What is claimed is:

1. A firmly joined assembly which comprises two members to be joined, each member having a face to be placed in contact with the corresponding face of the other member, each member having at least one part carrying a retaining projection, said retaining projections being engaged one with the other under elastic restoration of one of said retaining projections with slight resilient deformation of said one of said parts when said member faces are placed in contact with each other, separation means adapted for disengaging said retaining projections from one another against an elastic restoration force of said one of said parts and means for receiving an actuating force for actuating said separation means.

2. The device as claimed in claim 1, wherein said separation means is an inflatable joint mounted between said retaining projections and connectable to a pressure source for actuating said separation means.

3. The device as claimed in claim 1, wherein said separation means is formed by a joint retractable when subjected to a vacuum for actuating said separation means.

4. The device as claimed in claim 1, further comprising a pneumatic actuator for providing said activating force to said separation means.

5. The device as claimed in claim 1, wherein said separation means is formed by a sealed chamber, of which a part at least of one of said retaining projections forms a wall portion and which is disposed so that a difference between the pressure of the chamber and the external pressure causes separation of said retaining projections from the portion on which it is engaged, and a duct provided passing through at least one of the parts to be joined together and emerging, on the one hand, outside and, on the other, in said chamber and permitting connection thereof to a pneumatic machine.

6. The device as claimed in claim 5, wherein said sealed chamber is formed by tight contact of the retaining projections against a wall of the other part.

7. The device as claimed in claim 5, wherein said sealed chamber is formed by the projections of one of the parts and of the retaining projections.

8. A snap-fit device for joining two parts together by fitting, perpendicularly to their junction surfaces, at least one projection element projecting from the junction surface of one of the parts, after deformation thereof, into a recess in the junction surface of the other part, and engagement of said projection element, by resilient return thereof, on a surface portion of said recess, comprising:

separation means inside the device operable for separating said projection element from a portion of the other of said parts on which said engagement projection is engaged, against the resilient return force of said projection;

actuating means for actuating said separation means from outside the device, said separation means comprising a sealed chamber, of which a part of said projecting element forms a wall portion and which is disposed so that a difference between the pressure of the chamber and an external pressure causes separation of said projection from the portion on which it is engaged; and a duct passing through at least one of the parts to be joined together, having an end emerging outside said chamber and another end emerging inside said chamber, said duct permitting connection thereof to a pneumatic machine, wherein said sealed chamber is formed by the projections of one of the parts and a resilient membrane connecting ends of said projections together.

9. The device as claimed in claim 5, wherein said sealed chamber is formed by the projections of one of the parts and a wall connecting ends of the projections together and integrally formed therewith.

10. The device as claimed in claim 5, wherein said sealed chamber is formed between one projection of one of said parts and the wall of the other part on which said projection is engaged.

11. The device as claimed in claim 5, wherein said retaining projections of one of the parts and the sealed chamber form part of a separate element housed in a cavity of said part.

12. The device as claimed in claim 5, wherein said pneumatic machine includes a pressure source.

13. The device as claimed in claim 5, wherein said pneumatic machine includes a vacuum source.

14. The device as claimed in claims 1, further including a hydraulic actuator for providing said activating force to said separation means.

15. A snap-fit device for joining panels at adjoining end faces thereof, comprising:

a first coupling member located in one of said panels at an end face thereof and including first engagement means projecting from said end face of said one panel in a first direction along a major axis of said first engagement means, said first engagement means resiliently maintaining a rest position and elastically displaceable in a second direction substantially perpendicular to said first direction into a displaced position; and a second coupling member in an end surface of the other of said panels and including a recess in the other panel for accepting said first engagement means and including second engagement means for (i) engaging said first engagement means upon insertion of said first engagement means into said recess and elastic restoration of said first engagement means into said rest position thereby securing said first coupling member within said recess and for (ii) disengaging said first engagement means when said first engagement means is in said displaced position thereby permitting withdrawal of said first engagement coupling member from said recess, said first and second engagement means adapted to cause said displacement of said first engagement means permitting insertion of said first engagement means into said second coupling member recess and, by elastic restoration of said first engagement means into said rest position when fully positioned in said recess, said first engagement means engaging said second engagement means locking said first coupling member into said second coupling member; and separation means including a sealed chamber, a wall of which is formed by said projecting element, disposed so that a difference in pressure of the chamber and a pressure external to said chamber causes separation of said projection element from the portion on which it is engaged by elastic deformation of said first engagement means into said displaced position.

16. A snap-fit device for joining two parts together by fitting, perpendicularly to their junction surfaces, at least one projection element projecting from the junction surface of one of the parts, after slight deformation thereof, into a recess in the junction surface of the other part, and engagement of said projection element, by resilient return thereof, on a surface portion of said recess, comprising, inside the device, a means adapted, when it is actuated, for separating said projection element from a portion of the other of said parts on which said engagement projection is engaged, against an elastic restoration force of said projection element, said separation means comprising a sealed chamber, of which a part of said projecting element forms a wall portion and which is disposed so that a difference between the pressure of the chamber and the external pressure causes separation of said projection from the portion on which it is engaged, and a duct provided passing through at least one of the parts to be joined together and emerging, on the one hand, outside and, on the other, in said chamber and permitting connection thereof to a pneumatic machine, wherein said sealed chamber is formed by the projections of one of the parts and a resilient membrane connecting ends of said projections together.

17. The device as claimed in claims 8 wherein said projection element of said one part is insertable into said recess in the junction surface of the other part by relative translation of said parts along a common plane parallel to respective major surfaces of said parts.

18. The device as claimed in claims 1 wherein said retaining projections are engageable with each other by relative translation of said members along a common plane parallel to respective major surfaces of said members.

19. A modular wall system including a plurality of connectable wall panels, each wall panel comprising:

first and second fastening surfaces on opposite ends of each panel, said first fastening surface including an elongate male coupling member mounted on said first fastening surface and projecting from said first fastening surface substantially perpendicular thereto, said first coupling member having a distal end resiliently maintaining a static locking position and elastically displaceable into an unlocked position along a displacement direction substantially perpendicular to a longitudinal axis of said male coupling member in response to application of a deforming force to said distal end, said male coupling member resiliently self biased under elastic restoration following deformation to return to said locking position upon removal of said deforming force, said coupling member including a barb extending in said displacement direction;

said second fastening surface including a female coupling member mounted in a cavity in said second fastening surface for accepting said male coupling member of an adjacent one of said wall panels, said female coupling member including barb positioning means for displacing said male coupling member into said unlocked position when said male coupling member is partially inserted into said female coupling member, barb retaining means for engaging said barb in said female coupling member when said male coupling means is fully inserted in said female coupling means and is in said locking position thereby locking said male coupling in said female coupling for securing together said adjacent ones of said wall panels, and barb disengaging means operable in response to a pressure of an externally applied fluid for positioning said male coupling member into said unlocked position when said male coupling member is inserted into said female coupling member thereby unlocking said male coupling from said female coupling and permitting retraction of said male member from said female coupling for separating said adjacent ones of said wall panels; and fluid coupling means for supplying said fluid to said barb disengaging means.

20. An improved system for positively engaging a first member having an opening with a second member having an extending portion shaped to closely fit into said opening when said second member is moved relative to said first member in a first direction, the improvement comprising:

a rigid lip provided to said first member to extend inwardly of said opening;

a locking part provided to said second member to extend transversely of a longitudinal direction of said extending portion, said extending portion being formed to elastically deform in response to a first force applied in said first direction to enable locking engagement of said locking part with said lip and to deform in response to a transversely applied second force to move said locking part out of locking engagement with said lip; and means for applying said second force.

21. The system according to claim 20, wherein:
said extending portion has a distal end defined in part by a surface inclined to said longitudinal direction.

22. The system according to claim 20, wherein:
said means for applying said second force comprises means for receiving a fluid at a predetermined pressure.

23. The system according to claim 22, wherein:
said fluid receiving means comprises a flexible member contacting both the first and the second members.

24. The system according to claim 22, wherein:
said fluid receiving means comprises a flexible member disposed within said extending portion of said second member.

25. The system according to claim 21 wherein:
said fluid pressure is subatmospheric.

26. The system according to claim 22 wherein:
said fluid pressure is subatmospheric.

* * * * *

UNITED STATES PATENT AND TRADEMARK OFFICE
CERTIFICATE OF CORRECTION

PATENT NO. : 5,102,253
DATED : April 7, 1992
INVENTOR(S) : Jerome PUGLIESI-CONTI It is certified that error appears in the above-identified patent and that said Letters Patent is hereby corrected as shown below:

On title page, item,

[75] Inventor: Jerome Pugliesi-Conti, 40 rue Royale, 92210 Saint-Cloud[; Christian Girardiere, 25 bis rue Franklin, 75116 Paris, both of] France Signed and Sealed this Third Day of August, 1993

Attest:

MICHAEL K. KIRK

Attesting Officer

Acting Commissioner of Patents and Trademarks